Nov. 12, 1968     A. O. LANDI     3,410,019

WEEDLESS LURE

Filed July 16, 1965

INVENTOR,
ANTHONY O. LANDI
BY

United States Patent Office 3,410,019
Patented Nov. 12, 1968

3,410,019
WEEDLESS LURE
Anthony O. Landi, 1225 W. 30th St.,
Erie, Pa. 16508
Filed July 16, 1965, Ser. No. 472,508
1 Claim. (Cl. 43—35)

ABSTRACT OF THE DISCLOSURE

A fish lure comprising a body with a longitudinal groove therein, and two fish hooks having eyes for mounting the hooks on spaced pins within the groove. The hook shanks cross each other and extend through a ring to be moved inwardly and outwardly of the groove by the longitudinal movement of the ring within the groove, and a helical spring is disposed within the groove to urge the ring to one end of the groove and retract the hook shanks into the lure body. A line or leader extends through the helical spring and is secured to the ring whereby movement of the ring will compress the spring and force the hook shanks outwardly of the lure body.

---

It is an object of the invention to provide a weedless fish lure which is simple in construction, economical to manufacture, and simple and efficient to use.

With the above other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
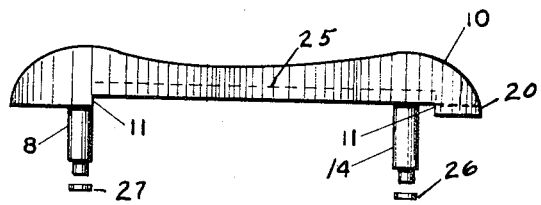
FIG. 1 is an elevation view of one-half of the body of the fish lure.
Figures 2, 5, 6:
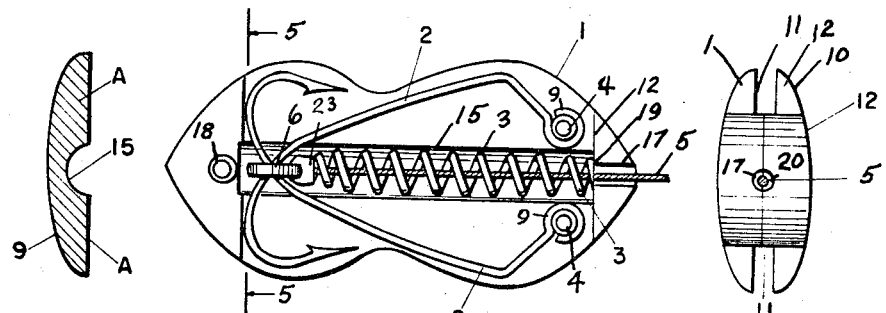
FIG. 2 is a plan view of the part of the body that mates with the part shown in FIG. 1 with the hooks shown in retracted position.
FIG. 5 is a cross sectional view taken on line 5—5 of FIG. 2.
FIG. 6 is an end view of the fish lure showing the halves shown in FIGS. 1 and 2 in assembled position.

Now with more particular reference to the drawings, the fish lure is made up of the two halves 1 and 10. The two parts 1 and 10 fit together as shown in FIG. 6 when it is in assembled position. When in assembled position, the body has a streamline shape which will allow it to pass through the water in a manner that suggests the travel of a minnow.

Figure 3:
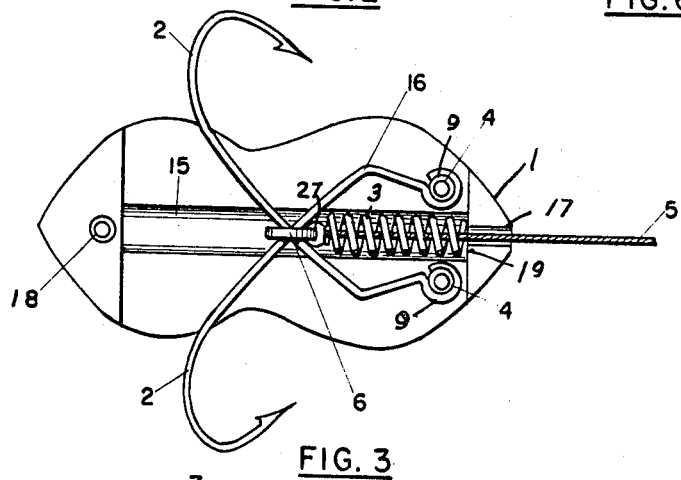
FIG. 3 is a view similar to FIG. 2 showing the hooks in fully opened position.
Figure 4:
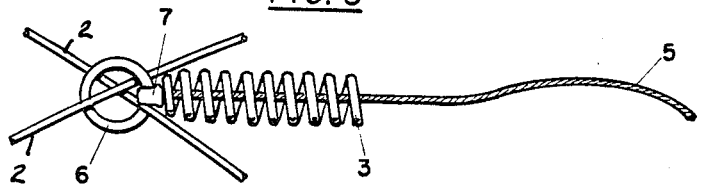
FIG. 4 is an enlarged partial view of the snap rings and hooks.

The half 10 of the body is undercut at 11 and the half 1 of the body is undercut at 12 so that a space is defined between half 1 and half 10 of the body when it is in assembled position. This space receives the hooks 2. The space made by the undercuts 11 and 12 is approximately equal to twice the thickness of one of the hooks 2 so that the hooks will freely move in this space when they move from position shown in FIG. 2 and the position shown in FIG. 3.

The pins 14 pass through the eyes 9 of the hooks and into holes 4 in the body half 1. Washers 26 and 27 may be then placed on the reduced size ends of pins 14, and the pin 8 will be received in the hole 18 in the body half 1 and the washer 27 riveted thereto.

The body half 1 has a groove 15 in it that receives the compression helical spring 3. One end of the spring rests against a ring 6 disposed in the groove. The other end of the spring 3 rests against the end 19 of the groove 15. A reduced size slot 17 is formed in the half 1 and a reduced size slot 20 is formed in the half 10. These two slot halves define a hole through which the leader 5 may extend.

The hooks are bent at 16 and they cross as shown and pass through the ring 6. The ring 6 is fixed to the end of the leader 5 at 23. The spring 3 is thus received in the groove 15 in the half 1 and the groove 25 in the half 10.

When the two halves of the lure are assembled, as shown in FIG. 6, the spring 3 is sufficiently strong to hold the hooks in the weedless position shown in FIG. 2 while the lure is being pulled through the water. When a fish strikes the lure and takes it in his mouth and exerts a pull on it, this force reaction will exert a tension on the leader 5 which will compress spring 3 and pull the hooks to the position shown in FIG. 3 where they will imbed themselves in the fish's mouth thereby catching the fish.

The embodiments of the invention in which an exclusive property or privilege is claimed are defined as follows:

Having thus completely and fully described the invention, what is now claimed as new is as follows:

1. A weedless lure comprising in combination a body having a longitudinal groove formed in the center thereof and provided with an abutment portion at each end of the groove, a first and a second mounting means each comprising a pin within said groove, two hooks having shanks with eyelets and barbed points disposed in said groove with each of said eyelets being pivoted on one of said mounting means, a ring disposed in said groove, said shanks being disposed in intersecting and angular crossed relation with each other and slidably received and reciprocably movable in said ring at their intersection to slide freely within said ring in a longitudinal reciprocating motion within the limits afforded by the abutment portions, thereby sliding the barbed points of said hooks away from each other laterally outward from said body when said ring is moved toward one end of said groove, a helical spring being disposed in said groove between said shanks and said mounting means and engaging said ring and urging said ring to the other end of said groove and said hooks into retracted relation in said body, and a fishing line extending through said helical spring and secured to said ring, whereby a pull on said line will compress said spring and force said hooks outwardly.

References Cited

UNITED STATES PATENTS

| | | | |
|---|---|---|---|
| 1,021,699 | 3/1912 | Nordlund | 43—37 X |
| 1,430,642 | 10/1922 | Gross | 43—35 |
| 2,463,978 | 3/1949 | Kunzelman | 43—35 |

ALDRICH F. MEDBERY, *Primary Examiner.*

D. J. LEACH, *Assistant Examiner.*